United States Patent
Yu et al.

(10) Patent No.: US 10,297,076 B2
(45) Date of Patent: May 21, 2019

(54) APPARATUS AND METHOD FOR GENERATING 3D FACE MODEL USING MOBILE DEVICE

(71) Applicant: ELECTRONICS AND TELECOMMUNICATIONS RESEARCH INSTITUTE, Daejeon-si (KR)

(72) Inventors: Jung Jae Yu, Daejeon-si (KR); Hyun Kang, Daejeon-si (KR); Jae Hean Kim, Sejong-si (KR); Hye Sun Kim, Daejeon-si (KR); Chang Joon Park, Daejeon-si (KR); Yun Ji Ban, Daejeon-si (KR); Dong Wan Ryoo, Daejeon-si (KR); Jin Sung Choi, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 61 days.

(21) Appl. No.: 15/405,728

(22) Filed: Jan. 13, 2017

(65) Prior Publication Data

US 2017/0213385 A1    Jul. 27, 2017

(30) Foreign Application Priority Data

Jan. 26, 2016    (KR) .................. 10-2016-0009441

(51) Int. Cl.
*G06T 17/20* (2006.01)
*G06K 9/46* (2006.01)
*G06T 19/20* (2011.01)
*H04N 7/18* (2006.01)

(52) U.S. Cl.
CPC ............ *G06T 17/20* (2013.01); *G06K 9/4604* (2013.01); *G06T 19/20* (2013.01); *H04N 7/185* (2013.01)

(58) Field of Classification Search
CPC ............................ G06T 17/20; G06K 9/4604
See application file for complete search history.

(56) References Cited

U.S. PATENT DOCUMENTS

| | | | |
|---|---|---|---|
| 8,472,700 B2 | 6/2013 | Kim et al. | |
| 2012/0162372 A1 | 6/2012 | Ghyme | |
| 2013/0086674 A1* | 4/2013 | Horvitz | G06F 21/32 726/19 |
| 2013/0286161 A1 | 10/2013 | Lv et al. | |
| 2014/0257532 A1 | 9/2014 | Kim et al. | |

FOREIGN PATENT DOCUMENTS

| | | |
|---|---|---|
| KR | 10-2005-0045774 A | 5/2005 |
| KR | 10-2009-0012874 A | 2/2009 |
| KR | 10-2011-0056865 A | 5/2011 |

* cited by examiner

*Primary Examiner* — Jeffery A Williams
(74) *Attorney, Agent, or Firm* — LRK Patent Law Firm

(57) ABSTRACT

An apparatus for generating a 3-dimensional face model includes a multi-view image capturer configured to sense a motion of the mobile device and automatically capture still images from two or more directions; and a 3D model generator configured to generate a 3D face mode using the two or more still images obtained by the multi-view image capturer.

15 Claims, 8 Drawing Sheets

APPARATUS AND METHOD FOR GENERATING 3D FACE MODEL USING MOBILE DEVICE

CROSS-REFERENCE TO RELATED APPLICATION(S)

This application claims priority to Korean Patent Application No. 10-2016-0009441, filed Jan. 26, 2016, in the Korean Intellectual Property Office, the disclosure of which is incorporated herein by reference in its entirety.

BACKGROUND

1. Field

The following description relates to a 3-dimensional (3D) face recognition technology, and more particularly, to an apparatus and method for generating a 3D face model using a mobile device.

2. Description of Related Art

A 3-dimensional face model which is widely used in various areas, such as art, films, and animations, is generated using laser scanning devices, or by analyzing a geometrical correlation between multi-view images obtained through multiple cameras placed around an object. These conventional methods require a dedicated space, a specific environment and equipment, and so cannot be utilized by general users who want to produce their 3D face model at low cost.

Recently, a method has been suggested which sequentially obtains images of an object from various directions using a camera built in a mobile device that is moving around the object, and produces a 3D model based on the obtained images that are regarded as simultaneously acquired multi-view images.

The aforesaid method for generating a 3D model based on multi-view images needs clear images that accurately show the texture of an object whereby a sufficient amount of feature point information can be extracted. 3D reconstruction is generally carried out based on multi-view images which are acquired by multiple multi-view cameras at the same time point on the time axis, whereas in the above method, facial images are subsequently obtained by a single camera which substitutes for the multi-view cameras and hence the user must capture the images with a minimal motion. If the user wants to capture real-time images of him/herself, the user needs to use a front facing camera on the same surface of the display of a mobile device. The user can capture such images in a still image mode or a video mode.

In the video mode, the user can continuously capture facial images from different angles while moving the camera, but the motion of the camera may cause the images to be blurry, and, by the nature of camera hardware, image quality of the video mode is generally lower than that obtained in the still-image mode.

Thus, in order to capture a clear image, the user needs to be ready for capturing at each direction while moving the camera and then take a still image. In this case, if the user presses a button inside or outside of a screen with a finger to capture the image, the mobile device may be shaken, and, in turn, the image quality is degraded.

When the user vocally instructs the image capturing using a voice interface function, the user's face may move. If the user captures images at specific time intervals using a timer, the user cannot have sufficient time to adjust the position and orientation of the mobile device at each time point.

As described above, the conventional technologies for creating a 3D face model based on multi-view images that are sequentially acquired by a single mobile device do not address the aforementioned problems, and nor do they suggest an approach for obtaining clear multi-view images of a user's face. Therefore, these technologies are too limited to be applied to the creation of 3D face model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an apparatus and method for creating a 3-dimensional (3D) face model using a mobile device, which can obtain clear multi-view still images that accurately represent a texture of an object whereby a sufficient amount of feature point information can be extracted.

The following description relates to an apparatus and method for creating a 3D face model using a mobile device, which allows a user to be able to capture an image at a moved location, without a user's specific instruction.

The following description also relates to an apparatus and method for creating a 3D face model using a mobile device, which allows sufficient time to adjust the position and orientation of a mobile device for each time of capturing.

In one general aspect, there is provided an apparatus for generating a 3D face model using a mobile device, the apparatus including: a multi-view image capturer configured to sense a motion of the mobile device and automatically capture still images from two or more directions; and a 3D model generator configured to generate a 3D face mode using the two or more still images obtained by the multi-view image capturer.

In another general aspect, there is provided a method of generating a 3D face model using a mobile device, the method including: sensing a motion of the mobile device and automatically capturing still images from two or more directions; and generating a 3D face mode using the two or more still images obtained by the multi-view image capturer.

Other features and aspects will be apparent from the following detailed description, the drawings, and the claims.

Figure 1:
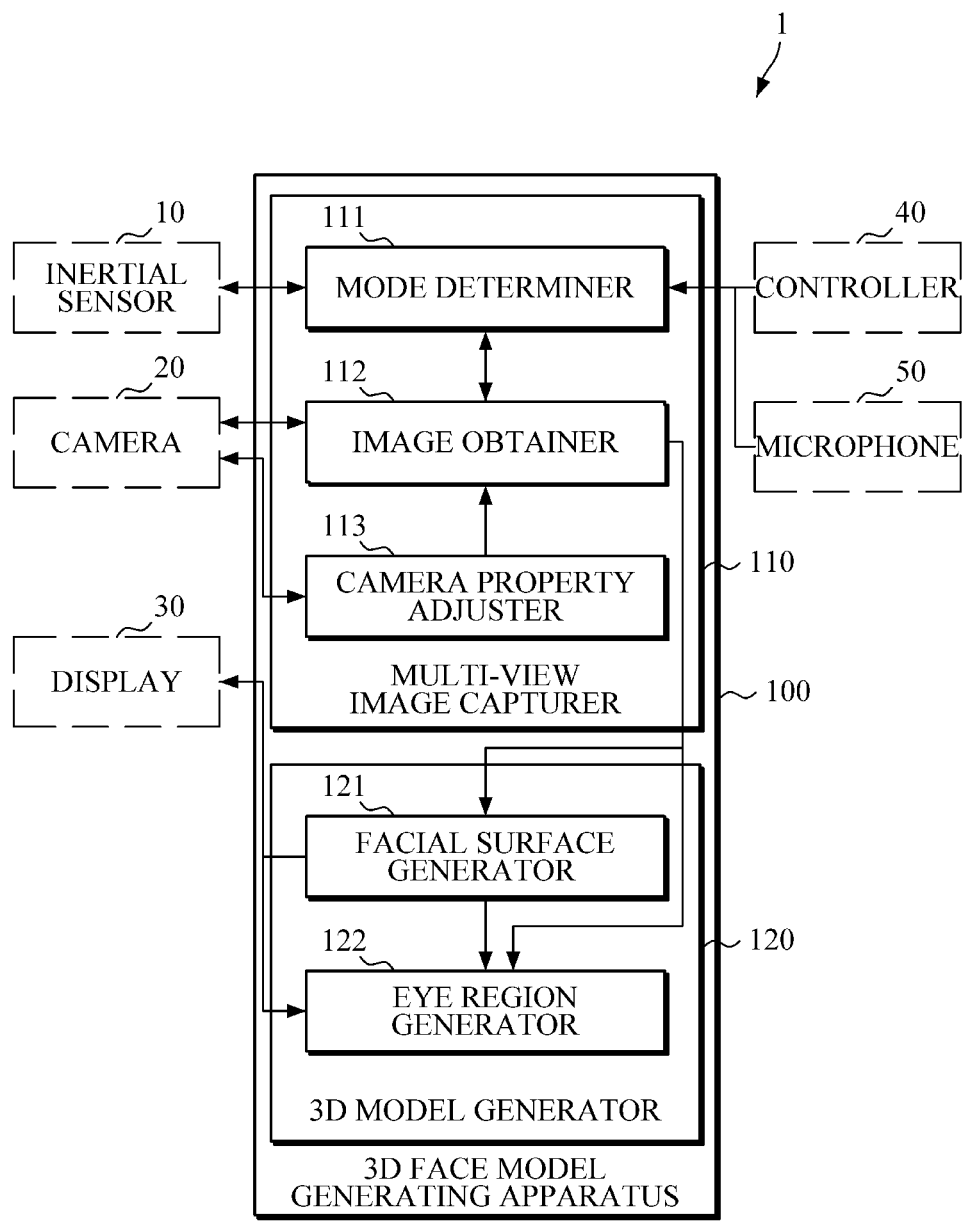
FIG. 1 is a diagram illustrating an apparatus for generating a 3-dimensional (3D) face model using a mobile device according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
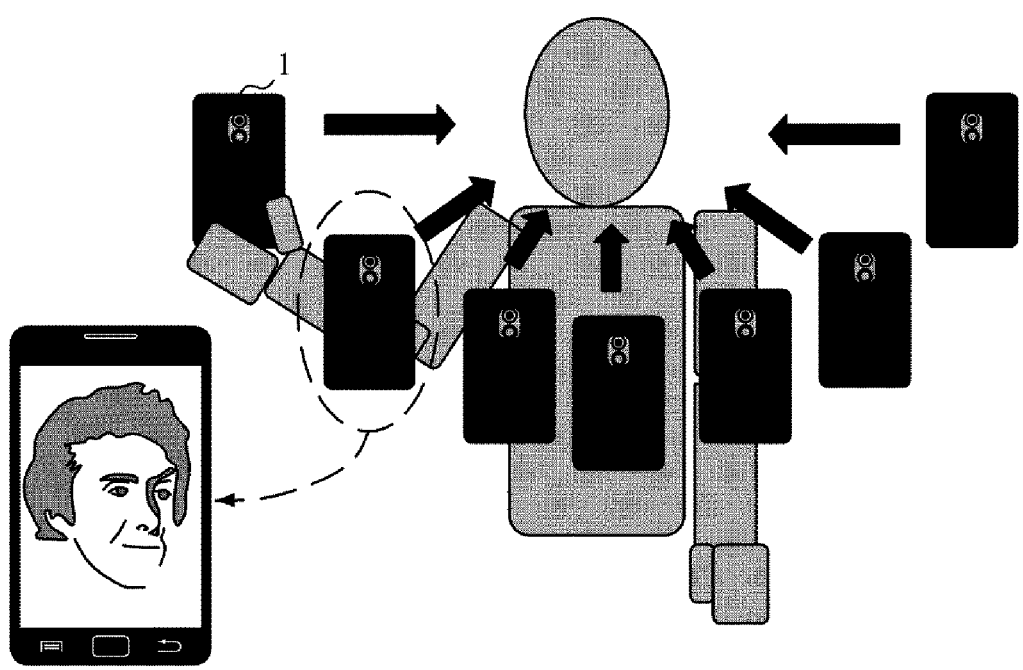
FIG. 2 is a diagram illustrating an example of a user capturing his/her face using a mobile device.

FIG. 1 is a diagram illustrating an apparatus for generating a 3-dimensional (3D) face model using a mobile device according to an exemplary embodiment. FIG. 2 is a diagram illustrating an example of a user capturing his/her face using a mobile device.

Referring to FIG. 1, the apparatus 100 for generating a 3D facial mode (hereinafter, will be referred to as an "apparatus") is provided in a mobile device 1, and generates a precise 3D face model as the user captures images of his/her face from various directions, as shown in FIG. 2.

The mobile device 1 may be a device, such as a smartphone, a tablet pad, etc., which is equipped with an inertial sensor 10 and a front facing camera 20 so that it can capture images of the user's face while the user is in motion.

The inertial sensor 10 senses azimuth, an angle of inclination and roll angles and rotation rate of the mobile device 1 and outputs the sensing data. The inertial sensor 10 is a well-known configuration, and hence the detailed description thereof will be omitted.

The camera 20 captures and outputs images, and may be a front-facing camera that allows the user to shoot while viewing the images captured by the camera 20. In addition, the camera may be able to zoom in or out on the image.

In addition, the mobile device 1 may further include a display 30 and a controller 40. The display 30 displays the images captured by the camera 20. The controller 40 that is means for receiving an instruction to start capturing may include, for example, a key input portion that generates key data each time a key button is pressed. Although FIG. 1 illustrates the display 30 as being separate from the controller 40, it may be possible to configure a user interface which incorporates the controller 40 and the display 30, such as a touch screen. In addition, the apparatus 100 may receive an instruction to start capturing that is input through a microphone 50.

The apparatus 100 includes a multi-view image capturer 110 and a 3D model generator 120. The multi-view image capturer 110 senses a motion of the mobile device 1 and automatically captures still images from two or more different directions. The 3D model generator 120 uses two or more still images obtained by the multi-view image capturer 100 to create a 3D face model.

The multi-view image capturer 110 may include a mode determiner 111 and an image obtainer 112, and may further include a camera property adjuster 113.

The mode determiner 111 determines a camera mode to be either a motion mode or a capture-standby mode according to a measured value from the inertial sensor 10 equipped in the mobile device 1. In the motion mode, while the user is moving the mobile device 1 horizontally across his/her face, as shown in FIG. 2, the user can take as much time as needed to adjust the position and orientation of the mobile device 1 such that the user's face can appear as large as possible within the image captured at each location of the camera. In the capture standby mode, the user may complete adjusting the position and orientation of the camera at a specific location and be ready to capture an image.

The mode determiner 111 sets a current mode to motion mode in response to a capture start instruction input by the user through'the controller 40. Then, the mode determiner 111 may continuously check the measured values from the inertial sensor 10, and sets the current mode to either a motion mode or a capture mode, according to the amount of motion for a certain length of time.

For example, the mode determiner 111 calculates an amount of motion of the mobile device 1 using Equation 1 below at designated time intervals, and, if the calculation result is equal to or greater than a specific threshold. sets the current mode to a motion mode. Otherwise, the mode determiner 111 may set the current mode to a capture-standby mode. That is, it is presumed that the user has completed preparation for capturing images, such as adjustment of position and orientation of the mobile device, and is ready for shooting a picture or a video, and so the current mode is changed from the motion mode to the capture-standby mode.

$$\frac{AbsSum(t, t - t_{w1})}{AbsSum(t - t_{w1}, t - t_{w1} - t_{w2})}. \quad (1)$$

In Equation 1, $AbsSum(t_1, t_2)$ is the sum of absolute values of acceleration components of the inertial sensor 10 in three axial directions for time period $(t_1, t_2]$. t denotes the current time, $t_{w1}$ and $t_{w2}$ are fixed constants: $t_{w1}$ is set to be a time for which the user stands by for image capturing after moving the mobile device, and $t_{w2}$ is determined to be a value that is an experimentally obtained average time to be taken to adjust the position and orientation of the mobile device for capturing an image at the next location.

Figure 3:
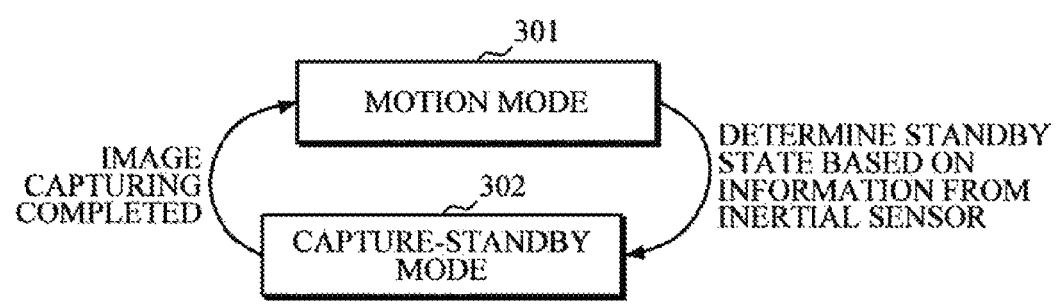
FIG. 3 is a diagram illustrating mode switch according to an exemplary embodiment.

FIG. 3 is a diagram illustrating mode switch according to an exemplary embodiment.

Referring to FIG. 3, when the capture-standby mode commences, the mode determiner 111 sends an image-capturing instruction signal to the image obtainer 112, and when receiving a capture completion signal from the image obtainer 112, the mode determiner 111 switches the current mode back to the motion mode. The mode determiner 111 repeats the mode switch, as shown in FIG. 3, until receiving a request for terminating the image capturing. By doing so, while the user is moving the mobile device 1 horizontally across his/her face, as shown in FIG. 2, the user can take as much time as needed to adjust the position and orientation of the mobile device 1 such that the user's face can appear as large as possible within the image captured at each location of the camera; and once the preparation for image capturing has been completed, it is possible to automatically capture an image of the user's face, without an additional instruction.

In response to the capture-standby mode being set by the mode determiner 111, the image obtainer 112 captures and obtains a still image. Each time the image obtainer 112 receives the image-capturing instruction signal from the mode determiner 111, the image obtainer 112 performs image capturing one time using the front-facing camera of the mobile device 1.

The camera property adjuster 113 obtains a test image of the user's face and adjusts ISO number of the camera and the sensitivity for feature point detection. In more detail, the camera property adjuster 113 detects feature points of a facial region from the test image, and increases the ISO number of the camera and the sensitivity of feature point detection until the number of detected feature points becomes greater than a specific threshold. In so doing, a sufficient number of feature points to generate a 3D face surface model can be detected when an actual multi-view image is achieved. Specifically, the camera property adjuster 113 extracts a facial region from the test image previously input, detects a skin region from the extracted facial region, and generates a facial skin region alpha map by performing morphology closing operation. The image obtainer 112 detects feature points from the input image that corresponds to a foreground of the facial skin region alpha map, in the same manner as the 3D model generator 120. If the number of feature points detected is smaller than the specific threshold (FeaMin_N), the camera property adjuster 113 increases the ISO number and sensitivity for feature point detection such that more feature points can be detected, and repeats the above operations of obtaining the test image, feature point detection, and adjustment of the ISO number and sensitivity for feature point detection until the number of feature points detected reaches the specific threshold (FeaMin_N).

The 3D model generator 120 includes a facial surface generator 121 and an eye region generator 122.

The facial surface generator 121 extracts feature points from the facial region of each of two or more still images obtained by the multi-view image capturer 110 and reconstructs a 3D face surface model. In more detail, the facial surface generator 121 estimates 3D points of the feature points and intrinsic and extrinsic variables of camera from the two or more still images. The facial surface generator 121 generates a dense point cloud using the estimated 3D points and camera information, and generates meshes by connecting the points, thereby reconstructing a 3D surface. By using the estimated camera information, a region of the input image that corresponds to each mesh is found and mapped to the reconstructed 3D surface. For example, in order to select a corresponding region from multiple frame images, the facial surface generator 121 may select a frame image in which a particular mesh is located and the principle axis of the camera lies as close as possible on the straight line with a normal vector of said particular mesh; take a texture of the region of the selected frame image that corresponds to the mesh; and map the texture to the mesh surface.

Because the multi-view images are achieved while the user's eyes are following the moving mobile device 1, the facial surface generator 121 cannot reconstruct an eye region, and thus the eye region generator 122 independently generates a 3D eyeball model that corresponds to the eye region, based on the two or more still images obtained by the multi-view image capturer 110, and maps the 3D eyeball model to the 3D face surface model.

Figure 4:
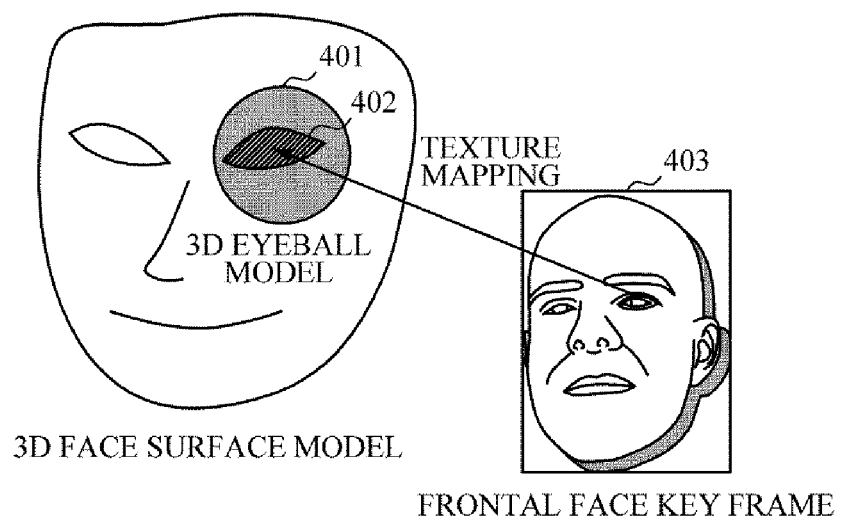
FIG. 4 is a diagram illustrating an example of generation of eye region according to the present disclosure.

FIG. 4 is a diagram illustrating an example of generation of eye region according to the present disclosure.

Referring to FIG. 4, the eye region generator 122 estimates the eye radius using a specific ratio of size between a face and an eyeball according to the size of the 3D face surface model, creates a 3D eyeball model 401 using the estimated eyeball radius, places the created 3D eyeball model 401 into the 3D face surface model, and maps a texture 402 of the eye region to a portion of the 3D eyeball model 401 that is exposed from the 3D face surface model. At this time, the texture 402 of the eye region may be achieved from a key frame 403 that has the highest intensity of frontal face detection among the two or more still images. Here, it may be assumed that the key frame 403 is an image in which the face takes up the most space, and the eye region is detected from the key frame 403 based on prior knowledge about the skin color and the eye region color. The eye region generator 122 obtains textures of pupil and the white of the eye from the frontal face key frame 403, and maps the texture 402 of the eye region to the exposed portion of the 3D eyeball model 401.

Figure 5:
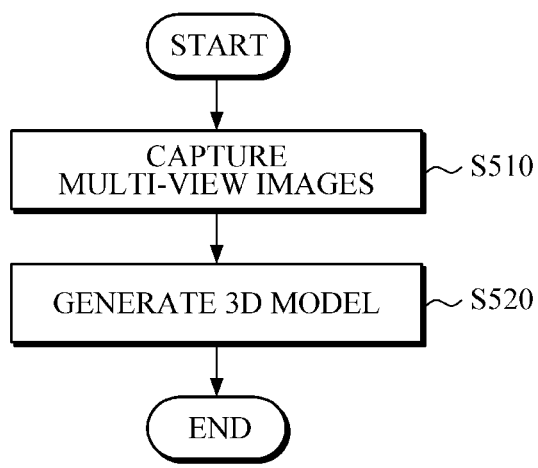
FIG. 5 is a flowchart illustrating a method of generating a 3D face model using a mobile device according to an exemplary embodiment.

FIG. 5 is a flowchart illustrating a method of generating a 3D face model using a mobile device according to an exemplary embodiment.

Referring to FIG. 5, the 3D face model generation method consists largely of two operations: S510 in which the apparatus 100 senses the motion of the mobile device 1 and automatically captures still images from two or more directions, and S520 in which the apparatus 100 generates a 3D face model using the obtained two or more still images.

To be specific, in S510, the camera mode is set to either a motion mode or a capture-standby mode according to a measured value from the inertial sensor equipped in the mobile device, and in response to the camera mode being set to the capture-standby mode, still images are obtained by capturing the user's face, which will be described below in detail with reference to FIG. 6. Additionally, in S510, a test image is obtained and ISO number of the camera and sensitivity of feature point detection are adjusted, which will be described below in detail with reference to FIG. 7.

Operation S520 will be described below in detail with reference to FIG. 8.

Figure 6:
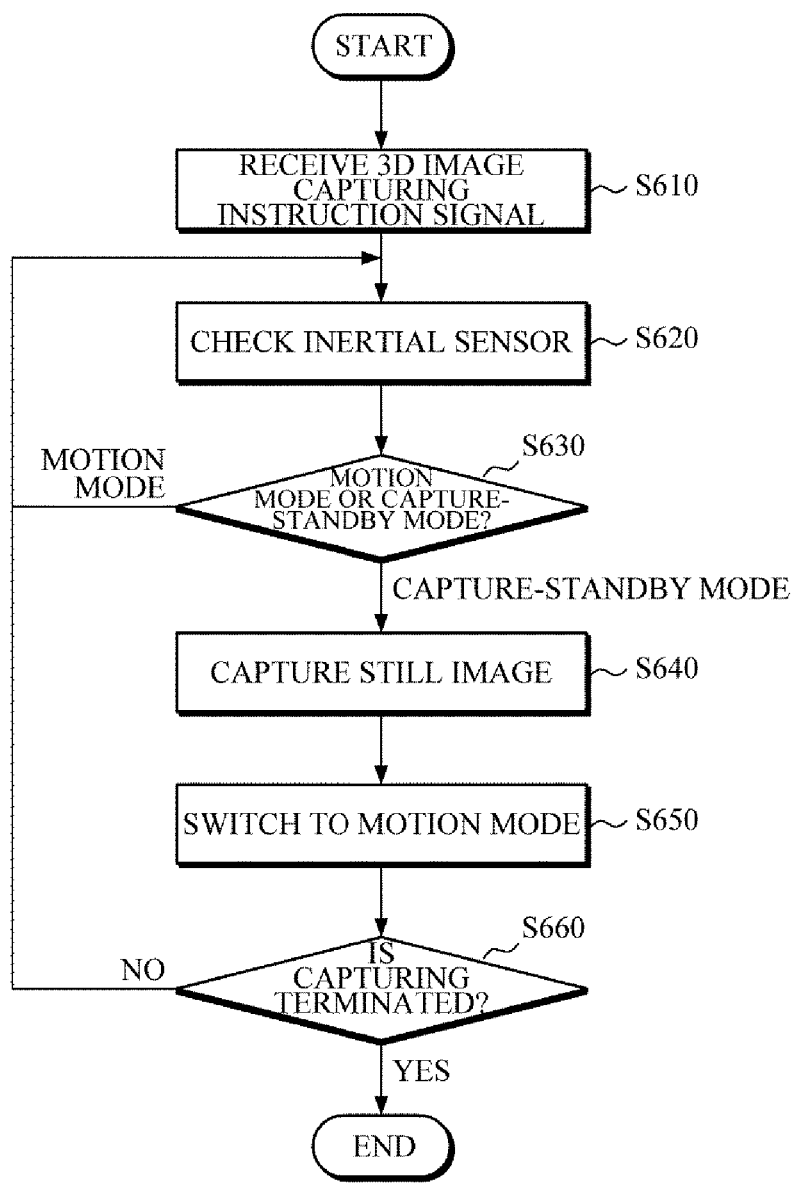
FIG. 6 is a flowchart illustrating the process of achieving a multi-view image according to the exemplary embodiment of FIG. 5.

FIG. 6 is a flowchart illustrating the process of achieving a multi-view image according to the exemplary embodiment of FIG. 5.

Referring to FIG. 6 in conjunction with FIG. 1, in response to receiving an image-capturing instruction signal from the user through the controller 40, as depicted in S610, the apparatus 100 sets the camera mode to a motion mode or a capture-standby mode according to a measured value from the inertial sensor 10, as depicted in S620-S630. More specifically, the apparatus 100 sets the current mode to motion mode, and then continuously checks the measured value from the inertial sensor 10, as depicted in S620, and then sets the current mode to the motion mode or the capture mode, as depicted in S630. At this time, the apparatus 100 calculates an amount of motion of the mobile device 1 using Equation 1 at designated time intervals, and, if the calculation result is equal to or greater than a specific threshold, sets the current mode to the motion mode, and otherwise, sets the current mode to the capture-standby mode.

When the current mode is set to the motion mode in S630, the apparatus 100 determines that the user is adjusting the position and orientation of the mobile device 1, and hence continues to check the measured value from the inertial sensor. On the contrary, when the current mode is set to the capture-standby mode, the apparatus 100 determines that the user is ready for capturing an image after completing the preparation, such as the adjustment of the position and orientation of the mobile device 1, and then obtains a still image by capturing the user's face, as depicted in S640. Once obtaining the still image, the apparatus switches the mode back to the motion mode, as depicted in S650.

The apparatus 100 repeats S620 to S650 until it receives a capturing-termination request from the user, as depicted in S660. By doing so, when the user is moving the mobile device 1 horizontally across the user's face, as shown in FIG. 2, once the preparation for capturing an image is completed at each location of the mobile device 1, it is possible to automatically capture an image without an additional instruction.

Figure 7:
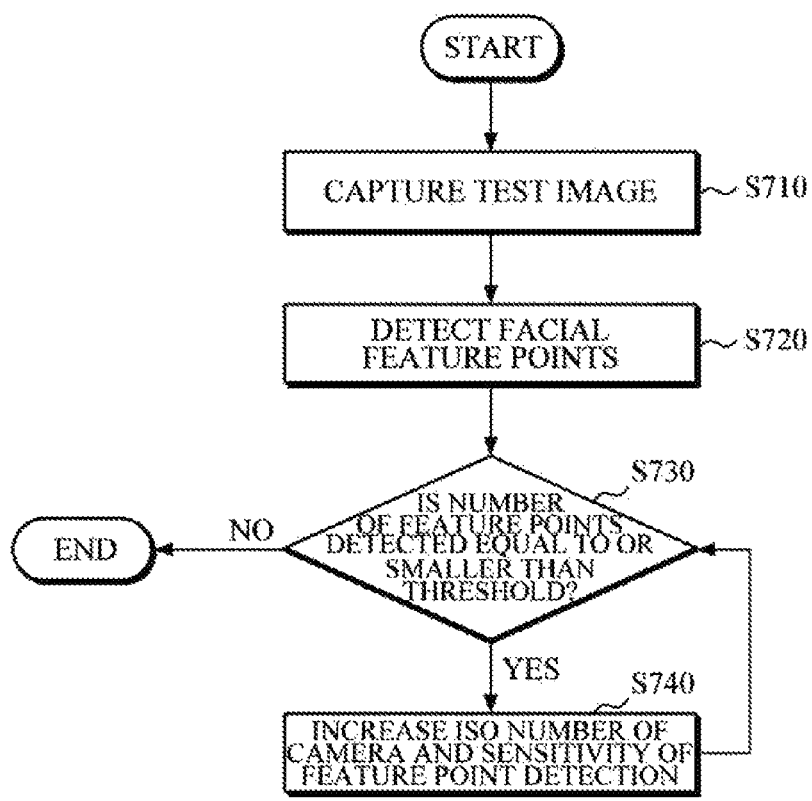
FIG. 7 is a flowchart illustrating the adjustment of camera properties according to the exemplary embodiment of FIG. 5.

FIG. 7 is a flowchart illustrating the adjustment of camera properties according to the exemplary embodiment of FIG. 5.

Referring to FIG. 7, the apparatus 100 obtains a test image of the user's face, as depicted in S710, and detects facial feature points from the test image, as depicted in S720. To be specific, the apparatus extracts the facial region, detects a skin region from the extracted facial region, and performs morphology closing operation to generate a facial skin region alpha map. Then, the apparatus 100 extracts feature points from an input image that corresponds to a foreground in the facial skin region alpha map.

The apparatus 100 determines whether the number of feature points detected is equal to or smaller than a specific threshold (FeaMin_N), as depicted in S730.

If it is determined in S730 that the number of feature points is smaller than the threshold (FeaMin_N), the apparatus 100 increases ISO number of the camera and the sensitivity of feature point detection such that more feature points can be detected, as depicted in S740. Operations S730 and S740 may be repeated until the number of feature points detected reaches the specific threshold.

Figure 8:
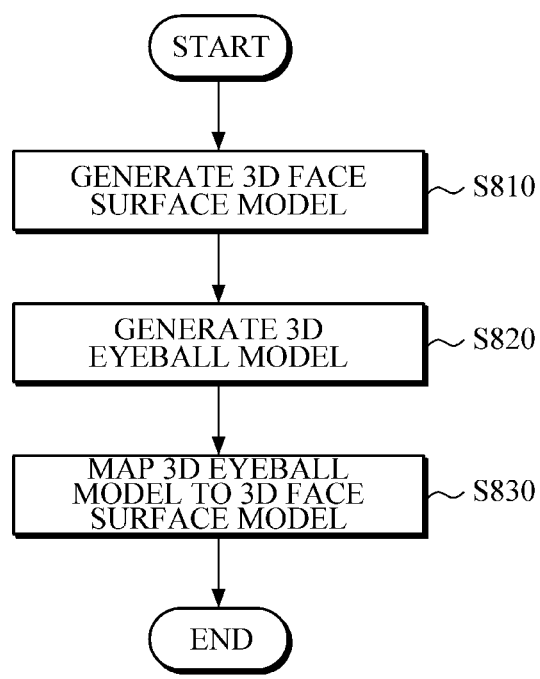
FIG. 8 is a flowchart illustrating the generation of a 3D face model according to the exemplary embodiment of FIG. 5.

FIG. 8 is a flowchart illustrating the generation of a 3D face model according to the exemplary embodiment of FIG. 5.

Referring to FIG. 8, the apparatus detects facial feature points from two or more still images obtained for multi-view image, and reconstructs a 3D face surface model, as depicted in S810. In more detail, the apparatus 100 estimates 3D points of the feature points and intrinsic and extrinsic variables of camera from the two or more still images. The apparatus 100 generates a dense point cloud using the estimated 3D points and camera information, and generates meshes by connecting the points, thereby reconstructing a 3D surface. By using the estimated camera information, a region of the input image that corresponds to each mesh is found and mapped to the reconstructed 3D surface. For example, in order to select a corresponding region from multiple frame images, the facial surface generator 121 may select a frame image in which a particular mesh is located and the principle axis of the camera lies as close as possible on the straight line with a normal vector of said particular mesh; take a texture of the region of the selected frame image that corresponds to the mesh; and map the texture to the mesh surface.

Because the multi-view images are achieved while the user's eyes are following the moving mobile device 1, the apparatus 100 cannot reconstruct an eye region, and thus the apparatus 100 generates a 3D eyeball model that corresponds to the eye region, based on the two or more obtained still images, as depicted in S820. The apparatus 100 estimates the eye radius using a specific ratio of size between a face and an eyeball according to the size of the 3D face surface model, and creates the 3D eyeball model using the estimated eyeball radius.

Then, the apparatus 100 maps the generated 3D eyeball model to the 3D face surface model, as depicted in S830. In specific, the apparatus 100 places the created 3D eyeball model into the 3D face surface model, and maps a texture of the eye region to a portion of the 3D eyeball model that is exposed from the 3D face surface model. At this time, the texture of the eye region may be achieved from a key frame that has the highest intensity of frontal face detection among the two or more still images. Here, it may be assumed that the key frame is an image in which the face takes up the most space, and the eye region is detected from the key frame based on prior knowledge about the skin color and the eye region color.

In order to utilize the structure from motion (SfM) technique, whereby 3D information is reconstructed while a single camera is being moved, a target object or a background image must be stationary. When considering the constraints of the SfM technique, a method that allows a user to obtain a sequence of clear multi-view images with the minimum movement may be one of the most affecting factors which determine the accuracy of a result of the 3D reconstruction that uses the mobile device.

According to the exemplary embodiments of the present disclosure, a user can use information obtained by an inertial sensor in a mobile device to capture his/her face from different directions or angles with the minimum movement and without the assistance of other devices, and, in turn, can generate a 3D face model based on the obtained images. The generated 3D face model is applicable to a wide range of areas, such as character creation and authentication, remote medical services, etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a 3-dimensional (3D) face model using a mobile device, the apparatus comprising:
   a memory having stored thereon computer-executable instructions to cause a processor to implement the following:
   a multi-view image capturer sensing a motion of the mobile device and automatically capturing still images from two or more directions; and
   a 3D model generator generating a 3D face model using the two or more still images obtained by the multi-view image capturer,
   wherein the multi-view image capturer comprises:
   a mode determiner setting a camera mode to either a motion mode or a capture-standby mode according to a measured value from an inertial sensor equipped in the mobile device, and
   an image obtainer performing image capturing to obtain the still images in response to the mode determiner setting the camera mode to the capture-standby mode.

2. The apparatus of claim 1, wherein the mode determiner sets a camera mode to a motion mode or a capture-standby mode according to whether an accumulated amount of a motion of the inertial sensor that is calculated at designated time intervals is greater than a specific threshold.

3. The apparatus of claim 1, wherein the multi-view image capturer comprises a camera property adjuster obtaining a test image and adjusting ISO number of a camera and sensitivity of feature point detection.

4. The apparatus of claim 3, wherein the camera property adjuster detects facial feature points from the test image, and increases the ISO number of the camera and the sensitivity of feature point detection until a number of feature points detected reaches a specific value.

5. The method of claim 1, wherein the 3D model generator comprises:
   a facial surface generator extracting facial feature points from the two or more still images obtained by the multi-view image capturer and reconstructing a 3D face surface model, and
   an eye region generator generating a 3D eyeball mode that corresponds to an eye region, based on the two or more still images obtained by the multi-view image capturer, and, mapping the 3D eyeball model to the 3D face surface model.

6. The apparatus of claim 5, wherein the eye region generator estimates an eyeball radius using a specific ratio of size between a face and an eyeball according to a size of the 3D face surface model, creates the 3D eyeball model using the estimated eyeball radius, places the created 3D eyeball model into the 3D face surface model, and maps a texture of the eye region to a portion of the 3D eyeball model that is exposed from the 3D face surface model.

7. The apparatus of claim 6, wherein the eye region generator obtains a texture of the eye region from a key frame that has a highest intensity of frontal face detection among the two or more obtained still images.

8. A method of generating a 3-dimensional (3D) face model using a mobile device, the method being implemented by a processor executing instructions stored in a memory, and comprising:
   sensing a motion of the mobile device and automatically capturing still images from two or more directions; and
   generating a 3D face model using the two or more still images obtained by the multi-view image capturer,
   wherein the capturing of the still images comprises:
   setting a camera mode to either a motion mode or a capture-standby mode according to a measured value from an inertial sensor equipped in the mobile device, and
   performing image capturing to obtain the still images in response to the camera mode being set to the capture-standby mode.

9. The method of claim 8, wherein the camera mode is set to either the motion mode or the capture-standby mode according to whether an accumulated amount of a motion of the inertial sensor that is calculated at designated time intervals is greater than a specific threshold.

10. The method of claim 8, wherein the capturing of the still images comprises obtaining a test image and adjusting ISO number of a camera and sensitivity of feature point detection.

11. The method of claim 10, wherein the adjusting of the ISO number and the sensitivity comprises:
   detecting facial feature points from the test image, and
   increasing the ISO number of the camera and the sensitivity of feature point detection until a number of feature points detected reaches a specific value.

12. The method of claim 8, wherein the generation of the 3D face model comprises:
   extracting facial feature points from the two or more obtained still images and reconstructing a 3D face surface model,
   generating a 3D eyeball mode that corresponds to an eye region, based on the two or more obtained still images, and
   mapping the 3D eyeball model to the 3D face surface model.

13. The method of claim 12, wherein the reconstructing of the 3D eyeball model comprises:
   estimating an eyeball radius using a specific ratio of size between a face and an eyeball according to a size of the 3D face surface model, and
   creating the 3D eyeball model using the estimated eyeball radius.

14. The method of claim 12, wherein the mapping of the 3D eyeball model comprises:
   placing the created 3D eyeball model into the 3D face surface model, and
   mapping a texture of the eye region to a portion of the 3D eyeball model that is exposed from the 3D face surface model.

15. The method of claim 14, wherein the texture of the eye region is obtained from a key frame that has a highest intensity of frontal face detection among the two or more obtained still images.

* * * * *